United States Patent
Luong et al.

(10) Patent No.: US 7,805,537 B2
(45) Date of Patent: *Sep. 28, 2010

(54) METHOD AND APPARATUS FOR FLOODING LINK STATE PACKETS TO ACHIEVE FASTER CONVERGENCE

(75) Inventors: Steven V. Luong, San Jose, CA (US); Heidi H. Ou, San Jose, CA (US); Gerald Redwine, Raleigh, NC (US); James L. Ng, Mebane, NC (US); Kevin M. Eckhardt, Durham, NC (US); Scott R. Sturgess, Grimbergen (BE); Steven Moore, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/332,713

(22) Filed: Dec. 11, 2008

(65) Prior Publication Data

US 2009/0092052 A1    Apr. 9, 2009

Related U.S. Application Data

(63) Continuation of application No. 10/959,707, filed on Oct. 5, 2004, now Pat. No. 7,467,226.

(51) Int. Cl.
  *H04L 12/56* (2006.01)
(52) U.S. Cl. .................. 709/238; 709/227; 709/228; 370/238
(58) Field of Classification Search ............. 709/224, 709/226, 228, 238, 239; 370/238, 254
  See application file for complete search history.

(56) References Cited

U.S. PATENT DOCUMENTS

| 6,199,098 | B1 | 3/2001 | Jones et al. |
| 6,490,246 | B2 | 12/2002 | Fukushima et al. |
| 6,515,681 | B1 | 2/2003 | Knight |

(Continued)

OTHER PUBLICATIONS

M. Shand, et al., Restart Signaling for Intermediate System to Intermediate System (IS-IS), Copyright The Internet Society (2004). RFC 3847. pp. 1-20.

(Continued)

*Primary Examiner*—Khanh Q Dinh
(74) *Attorney, Agent, or Firm*—Weaver Austin Villeneuve & Sampson LLP

(57) ABSTRACT

Disclosed are methods and apparatus for flooding link state packets or packet data units (LSP's) from a first node to one other LSP receiving node, where the LSP's are flooded in an order that is related to relative costs of various paths emanating from the first node. That is, the first node sends its own LSP first since the first node has no cost relative to itself. The first node then sends other LSP's that are associated with a plurality of other LSP sending nodes that have previously flooded their LSP's to the first node. These other LSP's are sent by the first node to the other LSP receiving node in an order related to the relative costs associated with the paths from the first node to each of the other LSP sending nodes which had previously sent the other LSP's to the first node.

21 Claims, 7 Drawing Sheets

U.S. PATENT DOCUMENTS

| | | | |
|---|---|---|---|
| 6,724,722 B1 | 4/2004 | Wang et al. | |
| 6,831,667 B1 | 12/2004 | Russin et al. | |
| 7,058,016 B1 * | 6/2006 | Harper | 370/238 |
| 7,467,226 B2 * | 12/2008 | Luong et al. | 709/238 |
| 7,633,875 B1 * | 12/2009 | Harper | 370/238 |
| 2003/0147645 A1 * | 8/2003 | Imajuku et al. | 398/7 |
| 2006/0045024 A1 | 3/2006 | Previdi et al. | |

OTHER PUBLICATIONS

A. Hermelin, et al., "Extending the Number of Intermediate System to Intermediate System (IS-IS) Link State PDU (LSP) Fragments Beyond the 256 Limit", Copyright The Internet Society (2004). RFC 3786. pp. 1-14.

H. Smit, "Intermediate System to Intermediate System (IS-IS) Extensions for Traffic Engineering (TE)", Copyright The Internet Society (2004). RFC 3784. pp. 1-13.

Office Action dated Jan. 30, 2008 for corresponding U.S. Appl. No. 10/959,707.

Notice of Allowance dated Aug. 20, 2008 for corresponding U.S. Appl. No. 10/959,707.

* cited by examiner

METHOD AND APPARATUS FOR FLOODING LINK STATE PACKETS TO ACHIEVE FASTER CONVERGENCE

CROSS REFERENCE TO RELATED PATENT APPLICATION

This application is a continuation of and claims priority of U.S. patent application Ser. No. 10/959,707, entitled METHOD AND APPARATUS FOR FLOODING LINK STATE PACKETS TO ACHIEVE FASTER CONVERGENCE, filed 5 Oct. 2004 by Steven V. Luong, et al., which application is incorporated herein by reference in its entirety for all purposes.

BACKGROUND OF THE INVENTION

The present invention relates to apparatus and methods for facilitating routing protocol in a computer network. More specifically, it relates to flooding Link State Packets or Packet Data Units (LSP's), which are used in a link state type protocol, such as the IS-IS protocol.

In a network that uses the IS-IS protocol, for example, each node generates a set of LSP's that describe its connectivity to its neighbors and floods these LSP's to its neighbors at appropriate times as specified by the protocol or customized programming. This connectivity information specifies who is connected to whom and the cost associated with each connection, such as a value that is configured by an operator to correspond to a speed of a particular connection. Thus, each node receives connectivity information in the form of LSP's from its neighbors. The LSP's received at a particular node are then flooded by the particular node to its neighbors and, hence, propagated throughout the network. Each node in the network then uses its received LSP's to build a map of connectivity (sometimes referred to as a "shortest path tree" or SPT) using an algorithm, such as "shortest path first" or SPF) and determine possible routing paths (e.g., to form a routing table) based on the map of connectivity.

In some IS-IS implementations, the LSP's are organized by an 8 octet field (i.e., system ID+pseudonode ID+fragmentation number) in ascending order. When the LSP's are flooded, the LSP's with the smallest IDs are likely sent first because of their order in the LSP database. In the example of FIG. 1A, Node A (108) sends LSP's to its new IS-IS neighbor Node B (110). The LSP's includes Node A's LSP, Node X's LSP, Node Y's LSP, and Node Z's LSP. In this example network, Node X (102) is several hops away from node A. That is, Node Y (104) and Node Z (106) are positioned between Nodes X and A. When the LSP for Node X has the smallest system ID, Node B will receive the LSP for Node X first from Node A. Unfortunately, Node B may not be able to compute an SPT (shortest path tree) using an SPF (shortest path first) algorithm to node X because Node B has not yet received and processed LSP's from node A or any other nodes that have higher system ID values, such as Nodes Y or Z.

In another IS-IS implementation, the LSP's may be flooded based on the same 8 octets structure, but in descending order. In doing so, this may also result in prolonging node B's ability to reach node X if node X has the largest system ID. An IS-IS implementation may also choose to flood the LSP's in no particular order. By chance, the LSP for node X may still arrive ahead of other LSP's in the path to node X. Again, Node B will be delayed in converging on a path to node X.

In sum if the newly established router receives only the LSP's from the far away nodes and then computes an SPT, it may not discover a path to any nodes until it has received all the LSP's due to the failure of the two way connectivity check. This problem can be best described in the following simplified scenario that is also illustrated by the networks 150 and 152 of FIG. 1B. Network_1 (150) and Network_2 (152) are merged by connecting Node A (160) that belongs to Network_1 and Node E (164) that belong to Network_2. The nodes A and E are connected via an interface 162. Node A will flood all its LSP's for Network_1 to Node E, which will in turn flood these LSP's to all of the nodes of Network_2. Node A's own LSP will be flooded last. A particular node in Network_2 will receive LSP's of many nodes of Network_1, which will trigger calculation of an SPT. But each time that the particular node calculates the SPT to reach nodes in Network_1, it does not discover any paths because it has not received the LSP's of Node A that will arrive last.

In view of the above, there is a need for improved mechanisms for flooding LSP's in an efficient manner so that useful connectivity maps (or SPT's) may be determined efficiently.

SUMMARY OF THE INVENTION

Accordingly, the present invention provides methods and apparatus for flooding link state packets or packet data units (LSP's) from a first node to at least one other LSP receiving node, where the LSP's are flooded in an order that is related to relative costs of various paths emanating from the first node. That is, the first node sends its own LSP first since the first node has no cost relative to itself. The first node then sends other LSP's that are associated with a plurality of other LSP sending nodes that have previously flooded their LSP's to the first node. These other LSP's are sent by the first node to the other LSP receiving node in an order related to the relative costs associated with the paths from the first node to each of the other LSP sending nodes.

These and other features and advantages of the present invention will be presented in more detail in the following specification of the invention and the accompanying figures that illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
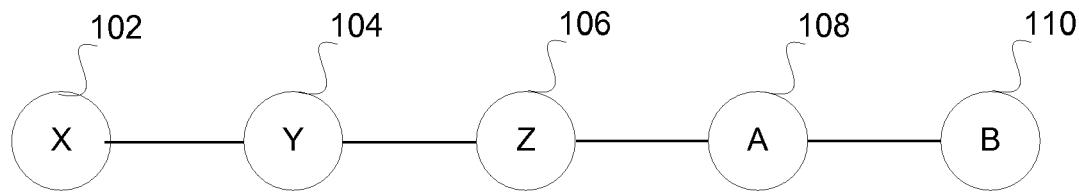
FIG. 1A is a diagrammatic illustration of a plurality of interconnected nodes or routers.
Figure 1B:
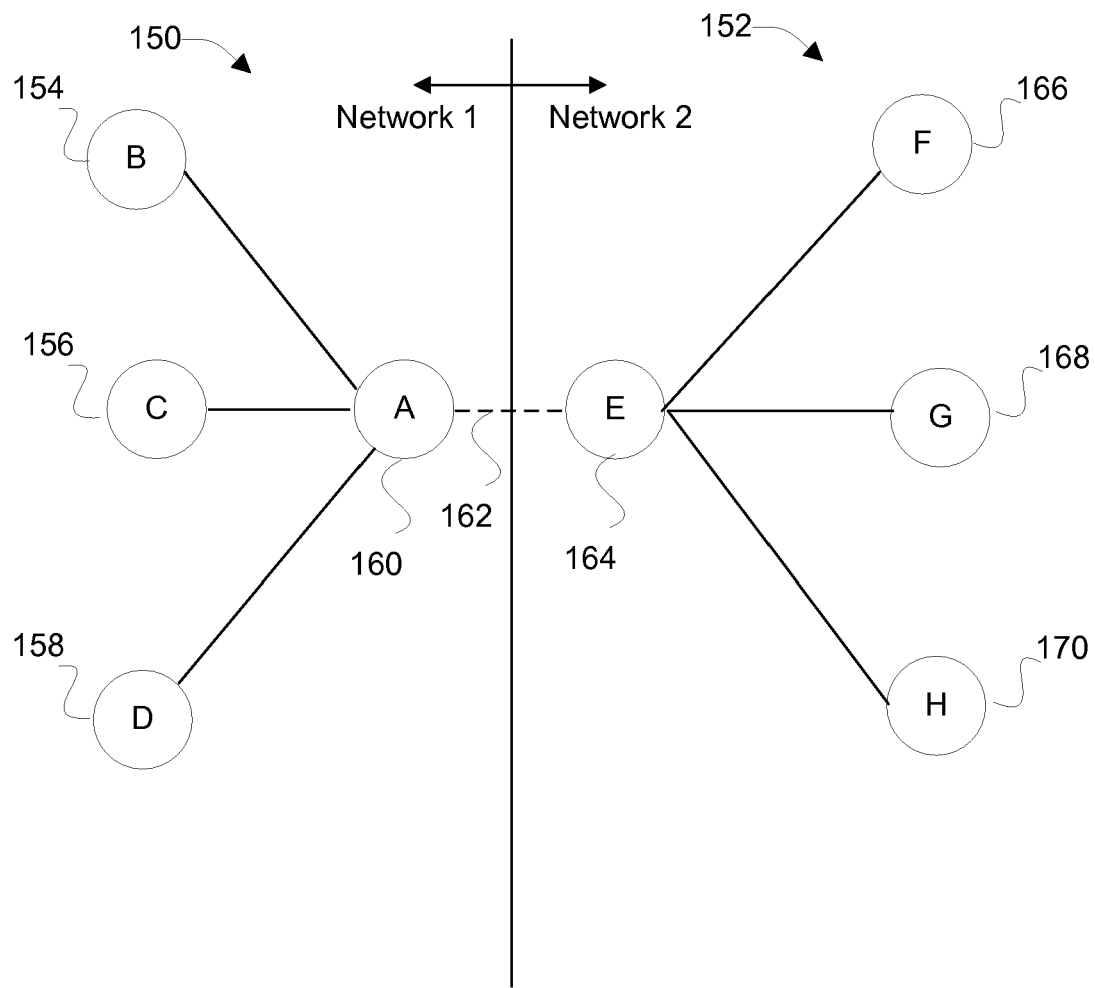
FIG. 1B is a diagrammatic illustration of two networks that each have a plurality of interconnected nodes or routers.
Figure 2:
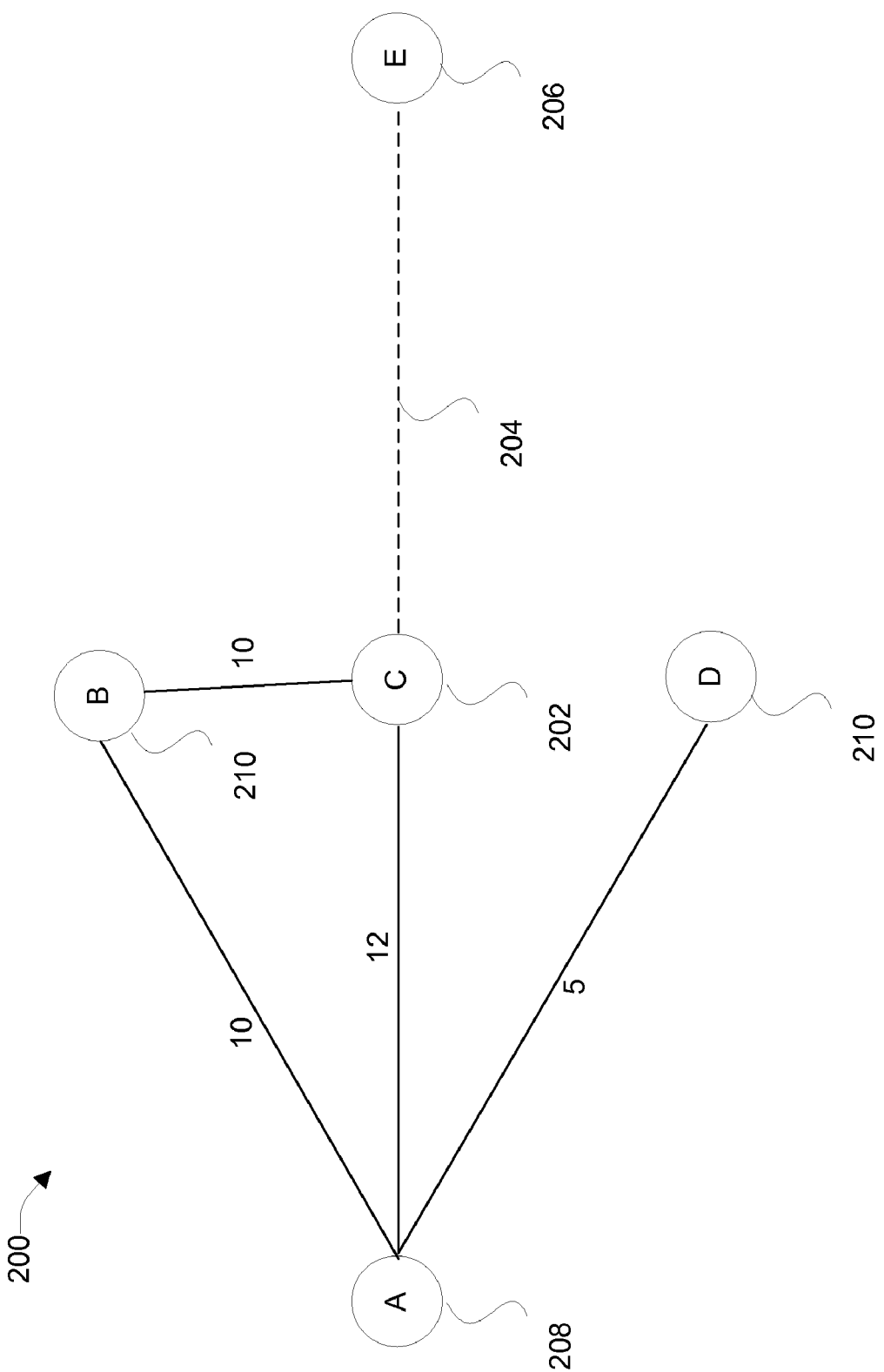
FIG. 2 is a diagrammatic representation of an example network in which techniques of the present invention may be implemented.

Techniques of the present invention are described herein with respect to FIG. 2, which is a diagrammatic representation of an example network 200. Such network configuration is merely illustrative and not meant to limit the scope of the invention. Additionally, although procedures are described herein as being performed by a particular node (e.g., a flooding node), it is noted that the procedures described herein may be distributed between any number and type of processing nodes. For instance, another node may determine relative costs for the LSP's received into the flooding node, even though the flooding node actually uses such determined relative costs for flooding LSP's to other nodes.

In general, the techniques of the present invention are applicable to any network event in which a plurality of LSP's are flooded from a first node to at least one other node. One such event occurs when a particular node obtains a new interface to another node or processing device. The particular node will then flood LSP's to the newly connected other node, and the newly connected other node will flood LSP's to the particular node if the new node is already coupled to other nodes (e.g., if two networks are merging). Additionally, the techniques of the present invention are suitably applied to any protocol that specifies the flooding of some form of link state packets, such as IS-IS that specifies the flooding of LSP's or OSPF (Open Shortest Path First) that specifies the flooding of LSA's (Link State Advertisements). The terms "link state packets", "link state packet data units, and "LSP's" are used here generically to refer to both LSP's and LSA's.

As shown in FIG. 2, Node C (202) has obtained a new interface 204 to Node E (206). Node C may obtain a new or modified interface to Node E under any suitable scenarios. By way of examples, a new interface occurs when a new node that has an interface to Node C starts up or restarts in the network, or two independent networks are merged together by coupling Node C with Node E.

Inventive mechanisms are provided for a node, such as Node C of FIG. 2, to flood LSP's in its database, for example, to another nodes, such as Node E of FIG. 2, in an efficient manner so that the flooded node (e.g., Node E) can quickly use the LSP's to build a connectivity map (e.g. by determining a shortest path tree or SPT) and route packets as soon as possible to newly available nodes. The SPT may be determined using any suitable algorithm, such as the shortest path first (SPF) algorithm. For clarity, an example scenario is described herein, where Node C is merely flooding LSP's to Node E although it is recognized that Node E may also flood LSP's to Node C if Node E is connected to a plurality of other nodes which Node C is unaware. In the present example, Node C floods LSP's to Node E in an order based on which corresponding nodes (which correspond to the flooded LSP's) have a lowest path cost.

In the example of FIG. 2, Node C has possession of an LSP for itself, as well as LSP's for Nodes A, B, and D when a flood trigger occurs, such as Node E being coupled to Node C. The cost associated with the shortest path from Node C to Node B is 10; the cost associated with the path to Node A is 12, and the cost associated with the path to Node D is 17. In this example, there are two paths from Node C to Node A. A first path has a first leg between Nodes C and B with an associated cost of 10 and a second leg between Nodes B and A with an associated cost of 10. This first path has a total cost of 20. There is also a direct path between Nodes C and A with a cost of 12. In one embodiment, the shortest cost path between Nodes C and A is used to determine in which order Node C should flood its LSP's. Thus, the relative costs in ascending order for Node C's LSP's are the LSP for Node C (LSP_C), the LSP for Node B (LSP_B), the LSP for Node A (LSP_A), and the LSP for Node D (LSP_D). During flooding based on these determined relative costs, Node C initially sends LSP_C to new Node E, and then sequentially sends LSP_B, LSP_A, and LSP_D.

The LSP flooding is generally based on predetermined relative costs for the paths from the flooding node to nodes for which it possesses LSP's. This predetermined cost assessment may be determined in any suitable manner. In one implementation, relative costs may be determined each time LSP's are flooded by the flooding node. Most preferably, the flooding node continuously determines the relative costs in ascending order as the flooding node receives each LSP and computes an SPT.

Figure 3:
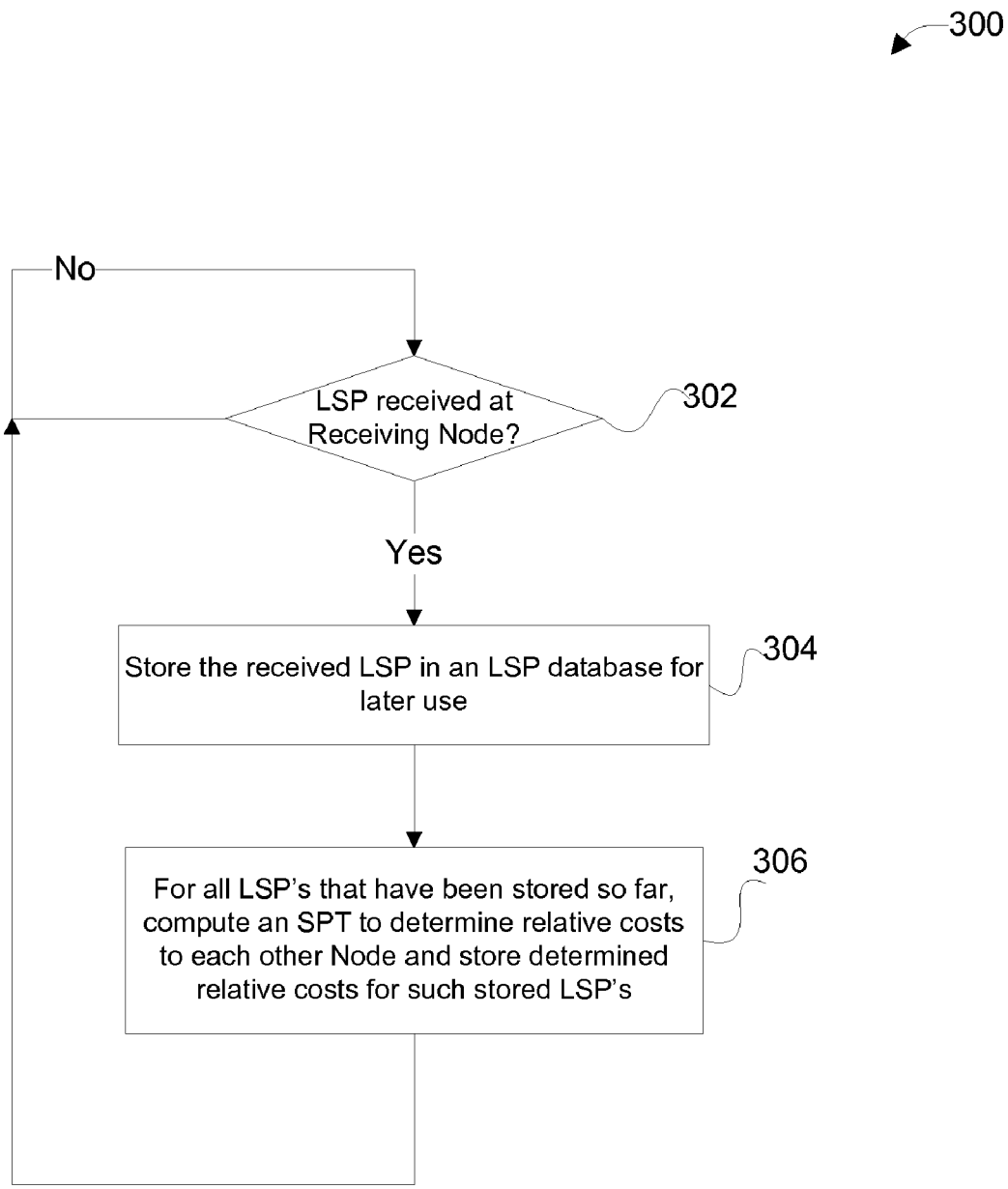
FIG. 3 is a flowchart illustrating a procedure for handling LSP's received by a particular node in accordance with one embodiment of the present invention.

FIG. 3 is a flowchart illustrating a procedure 300 for handling LSP's received by a particular node in accordance with one embodiment of the present invention. For example, this procedure is implemented as Node C of FIG. 2 receives LSP's from Nodes A, B, and D. Initially, it is determined whether an LSP is received at the receiving node (e.g., Node C) in operation 302. If an LSP is not received, the receiving node continues to wait for an LSP. If an LSP is received, the receiving node then stores the received LSP in an LSP database for later use in operation 304. When Node C receives each LSP (LSP_A, LSP_B, and LSP_D), each LSP is stored in the LSP database so that all of the LSP's received by Node C are eventually compiled in the LSP database. After a particular LSP is received, the receiving node may also compute an SPT to determine and store the relative costs of all of the LSP's that have been stored so far in operation 306. Several example data structures for storing relative costs of all of the stored LSP's, as well as for storing the LSP's, are described further below. After relative costs are determined, the procedure then repeats for and waits for another LSP to be received at the receiving node.

Figure 4:
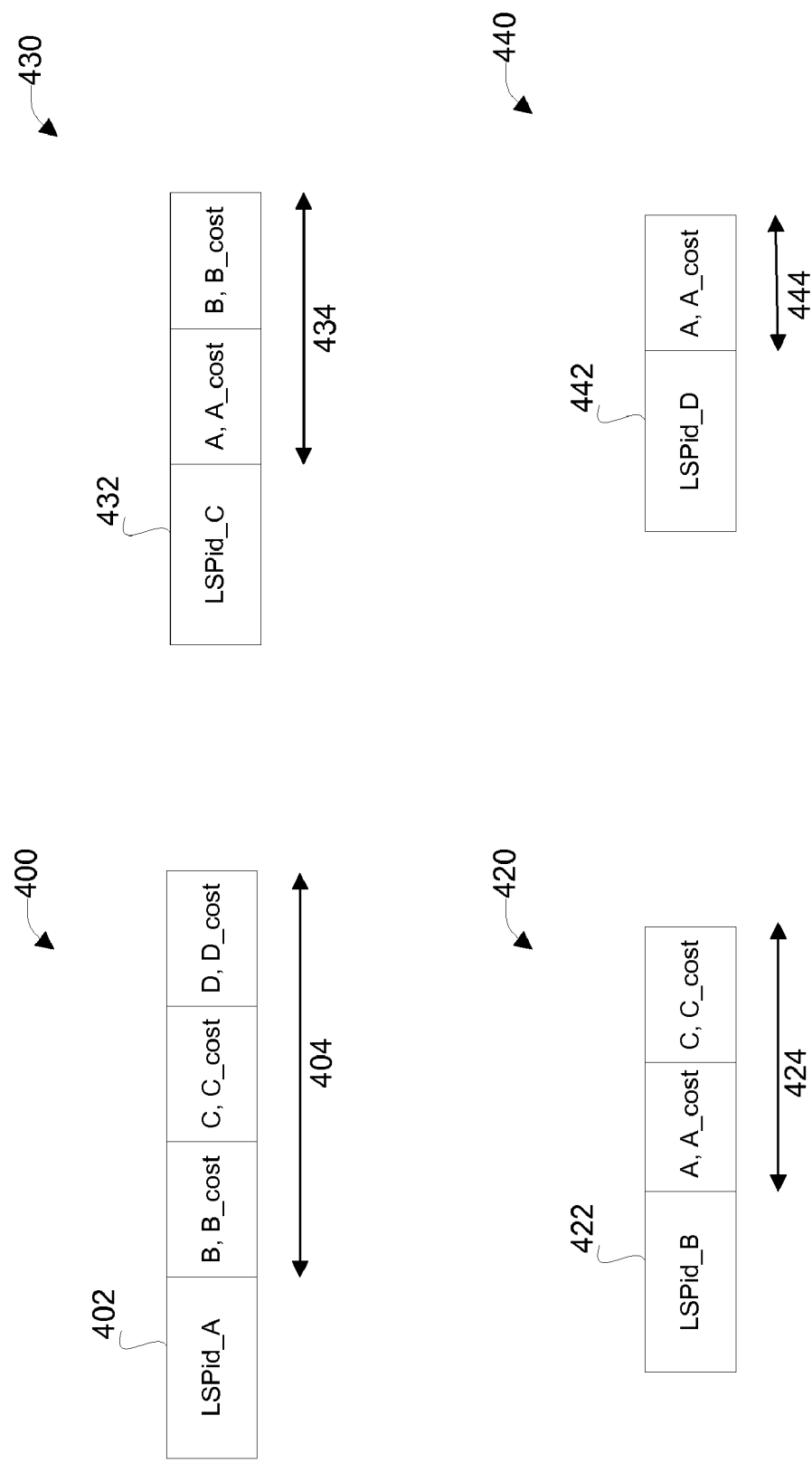
FIG. 4 illustrates a plurality of LSP's that are sent from other nodes to Node C of FIG. 2.

FIG. 4 illustrates a plurality of LSP's that are sent from other nodes to Node C of FIG. 2. As shown, LSP_A 400 for Node A includes an LSP identifier 402 and connectivity information 404. The connectivity information 404 for LSP_A includes identifiers for Nodes B, C, and D, as well as their corresponding costs, since these nodes are neighbors of Node A. LSP_B 420 for Node B includes an identifier 422 for Node B and connectivity information 424. The connectivity information 424 for LSP_B includes identifiers for Nodes A and C, as well as cost information for Nodes A and C, since Nodes A and C are neighbors of Node B. Similarly, LSP_C 430 for Node C includes an identifier 432 for Node C and connectivity information 434 for Node C. The connectivity information for LSP_C 434 includes identifiers for Nodes A and B, as well as cost information for Nodes A and B, since Nodes A and B are neighbors of Node C. Lastly, LSP_D 440 for Node D includes an identifier 442 for Node D as well as connectivity information 444 identifying Node A and its corresponding costs, since Node A is the only neighbor of Node D.

In the illustrated embodiment of FIG. 3, each time Node C receives an LSP, the received LSP is stored in an LSP database and relative cost information is determined for all of the LSP's received so far for Node C. The received LSP's and relative cost information may be stored in any suitable manner so as to allow easy access of the LSP's during flooding of such LSP's to another node and to allow the LSP's to be easily sent in an order corresponding to relative cost of paths associated with the LSP's node.

Figure 5:
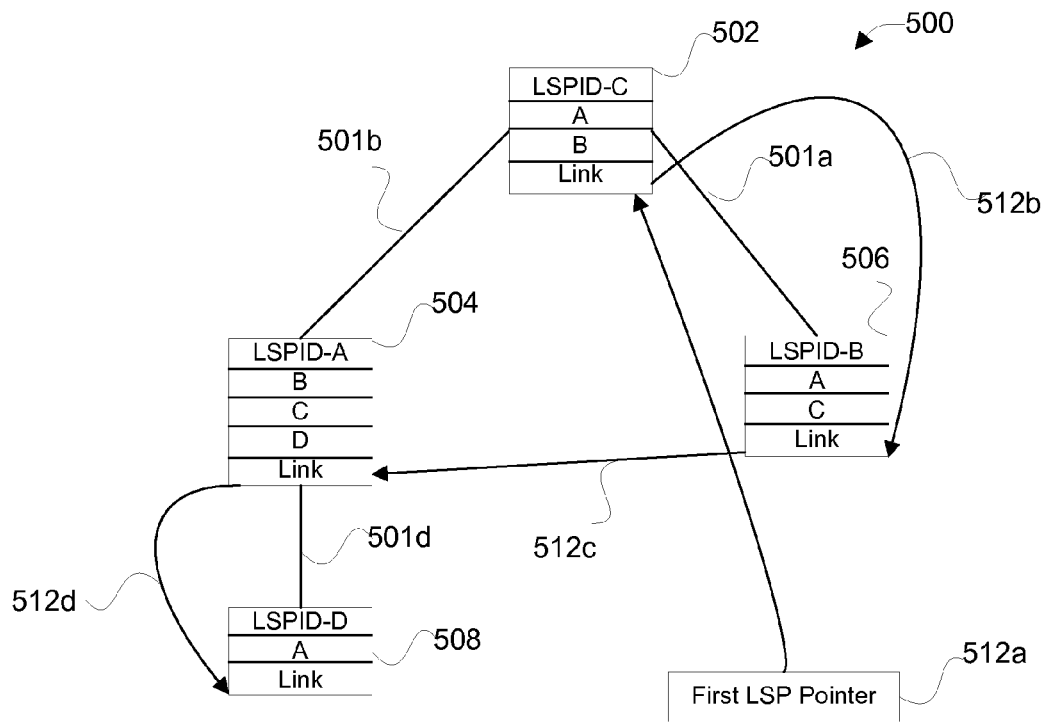
FIG. 5 illustrates a data structure that represents a plurality of received LSP's, as well as determined relative costs for such received LSP's, for Node C of FIG. 2 in accordance with a first implementation of the present invention.

FIG. 5 illustrates a data structure 500 that represents a plurality of received LSP's, as well as determined relative costs for such received LSP's, for Node C of FIG. 2 in accordance with a first implementation of the present invention. As shown, the LSP's received for Node and connectivity information for Node C are represented in an AVL tree or like structure. The AVL tree for Node C organizes the LSP's in a hierarchical arrangement that corresponds to the hierarchy of the nodes connected to Node C. As shown, the top element 502 includes the LSP_C for Node C, and this top element 502 includes an LSP identifier for Node C and connectivity information for Nodes A and B. This top element 502 for LSP_C is linked to hierarchically lower elements 504 and 506 that includes LSP_A for Node A and LSP_B for Node B, respectively, since Node C has an adjacency with both Nodes A and B. Likewise, lower element 504 for Node A is represented as being linked to lower element 508 for Node D. This element 508 for Node D includes LSP_D as well as connectivity information for Node D.

In this implementation, the data structure 500 also includes a first LSP pointer 512a for indicating which LSP retained by Node C has the highest priority or lowest cost. As shown, the first LSP pointer or link 512a points to element 502 that includes LSP_C. Alternatively, Node C may assume that it will always send its own LSP first and only point to the next lowest cost LSP (i.e., in this example LSP_B). In the illustrated example, the next link in the chain is link 512b and points to element 506 that includes LSP_B. The next link 512c points to element 504 that includes LSP_A. The last link in the chain is link 512d and it points to element 508 that includes LSP_D.

When Node C floods the LSP's to another node, the data structure of FIG. 5 allows the LSP's to be easily grabbed in order of their cost links 512. For example, the first LSP pointer 512a indicates the first LSP to be sent is LSP_C. The next link in the chain is link 512b and it indicates that LSP_B is to be sent. The next link 512c indicates that LSP_A is to be sent, and the next link 512d after link 512c indicates that LSP_D is to be sent last by Node C.

Figure 6:
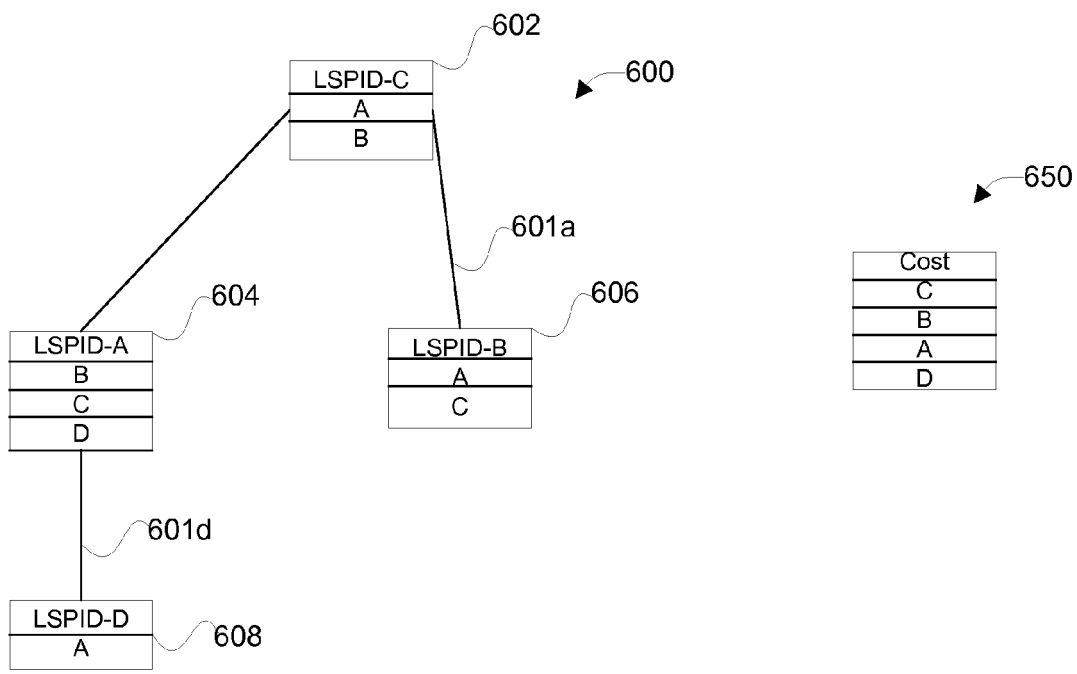
FIG. 6 is a diagrammatic representation of an AVL (named after its founders Adelson-Velskii and Landis) tree type LSP data structure and a Cost Table for Node C of FIG. 2 in accordance with a second implementation of the present invention.

FIG. 6 is a diagrammatic representation of an AVL tree type LSP data structure 600 and a Cost Table 650 for Node C of FIG. 2 in accordance with a second implantation of the present invention. The AVL data structure 600 is similar to the data structure 500 of FIG. 5, except a chain of cost links are not provided in the AVL data structure 600. As shown, the top element 602 includes LSP_C, and this top element 602 is linked to elements 604 and 606 that each includes LSP_A and LSP_B, respectively. Element 604 is linked to element 608 that includes LSP_D. In this implementation, a separate cost table 650 is maintained by Node C to list the LSP's in relative cost order from lowest to highest cost. As shown, the cost table 650 lists the LSP's in the following order from lowest to highest cost LSP: LSP_C, LSP_B, LSP_A, and LSP_D. In an alternative embodiment, Node C can be configured to always flood its own LSP automatically without regard to relative costs so LSP_C does not have to be listed in the cost table. In this later embodiment, Node C automatically sends LSP_C and then looks in the cost table to determine which other LSP's to send next.

Figure 7:
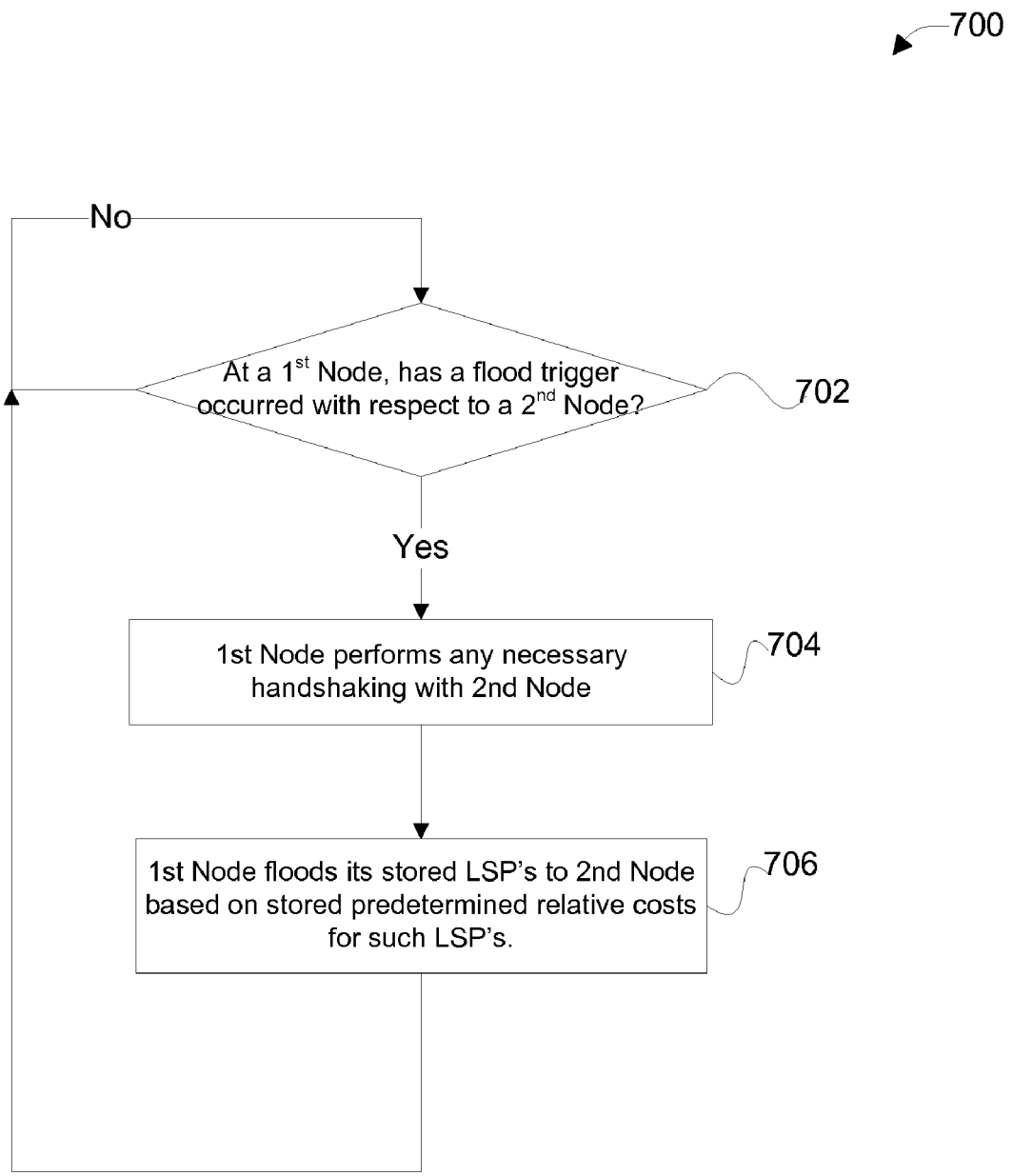
FIG. 7 is a flowchart illustrating a procedure for flooding LSP's in accordance with one embodiment of the present invention.

As a particular node receives and retains LSP's and determines relative costs of such received LSP's, the particular node may be triggered to flood its LSP's received so far. FIG. 7 is a flowchart illustrating a procedure 700 for flooding LSP's from a first node to at least a second node in accordance with one embodiment of the present invention. Initially, it is determined whether a flood trigger has occurred at a first node with respect to at least a second node in operation 702. Flood triggers include any event that indicates to a particular node that one or more of its interfaces have been modified or a new interface has been formed. For example, the second node may bring up an interface with the first node and send a HELLO to the first node so that the first node is aware of the new second node. The second node may also send a HELLO to the first node when two networks are merged together by joining the first and second nodes. If a flood trigger has not occurred, the first node process 700 merely waits for a flood trigger.

If a flood trigger occurs, the first node may then perform any necessary handshaking with the second triggering node in operation 704. In one implementation of the IS-IS protocol, after the second node sends a HELLO to the first node, the first node also sends a HELLO back to the second node. After HELLO's are exchanged, each node then exchanges CSNP (Complete Sequence Number PDU) data that indicates what LSP's each node has received. If one of the nodes has not received two or more LSP's, then the other node knows that a flood trigger has occurred and flooding can commence. After or during the handshaking between the first and second node, the first node then floods the LSP's to the second triggering node (if necessary based on its received CSNP) based on the predetermined and stored relative costs to each node associated with the flooded LSP's in operation 706 as described above. The procedure then repeats for and waits for another flooding event.

The mechanisms for flooding LSP's in an order that is based on relative costs allows receiving nodes to more efficiently build their connectivity maps or calculate their SPT using an SPF algorithm so that data can be routed to converged paths as soon as possible. Since an SPF calculation is more likely to result in valid paths that can be used immediately by the receiving node, the receiving node does not waste processing time for the SPF calculation that does not discover any paths. That is, the receiving node can incrementally converge on nodes that are closer in proximity and/or require less transmission time or cost. Additionally, these novel mechanisms do not require modification of the transmission protocol, e.g., IS-IS protocol specification and is backward compatible.

Generally, the techniques for flooding LSP's described herein may be implemented on any combination of software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid LSP flooding system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the LSP flooding system may be implemented on a general-purpose network host machine such as a personal computer or workstation. Further, the invention may be at least partially implemented on a card (e.g., an interface card) for a network device or a general-purpose computing device.

Figure 8:
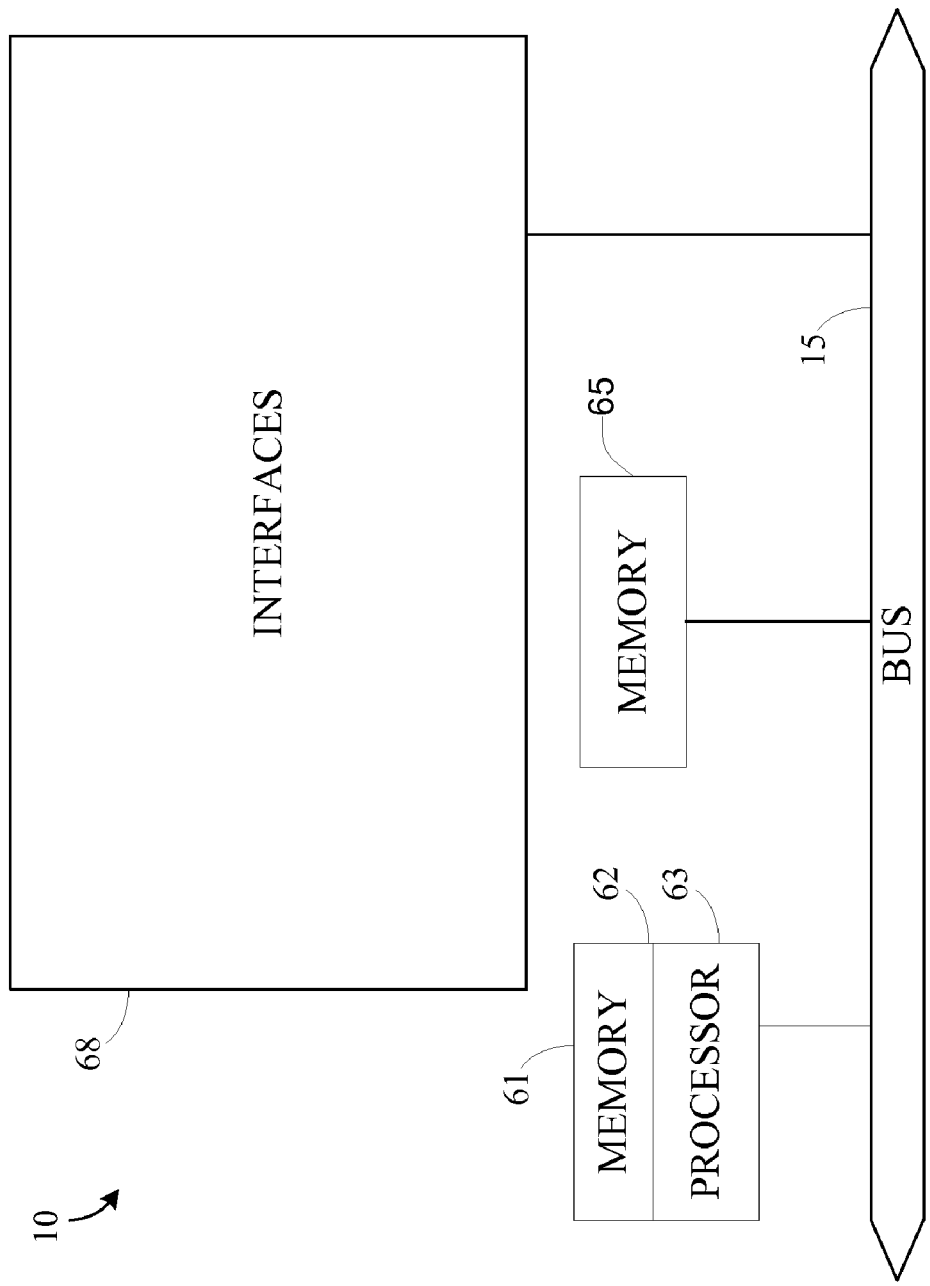
FIG. 8 is a diagrammatic representation of a router in which embodiments of the present invention may be implemented.

Referring now to FIG. 8, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for receiving and storing LSP's, determining relative costs associates with such received LSP's, storing the determined relative costs, flooding the receiving LSP's when necessary in an order related to the stored relative costs, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received LSP's, relative costs for such received LSP's, one or more data structures for LSP's and relative costs, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of flooding link state packets or packet data units (LSP's) from a first node to a second node, comprising:
   sending the first node's own LSP from the first node to the second node; and
   after the first node's own LSP has been sent to the second node, sending a plurality of other LSP's from the first node to the second node, wherein these other LSP's are associated with a plurality of third nodes that have previously flooded their LSP's to the first node, wherein the first node's own LSP is sent first and then the other LSP's are sent by the first node to the second node in an order that corresponds to an ascending order of the relative costs associated with a plurality of paths from the first node to each of these other LSP sending nodes.

2. A method as recited in claim 1, further comprising continuously determining the relative costs of the other LSP's and storing such relative costs in an ascending order of relative costs as each LSP is received into the first node, wherein the order in which the first node sends the other LSP's corresponds to the stored ascending order of the relative costs of such other LSP's.

3. A method as recited in claim 2, wherein the relative costs of the other LSP's are determined each time a new LSP is received at the first node.

4. A method as recited in claim 1, wherein each of the other LSP's includes connectivity information for one or more fourth nodes connected to the corresponding third node and one or more cost values from such corresponding third node to each of the one or more fourth nodes, and wherein determination of the relative costs is based on a plurality of cost values received within the other LSP's previously sent from the plurality of third nodes to the first node.

5. A method as recited in claim 4, wherein the cost values of each of the other LSP's each indicate a cost of a path from the corresponding one of the third nodes and a one of its neighbors.

6. A method as recited in claim 5, wherein the relative costs indicate a priority list of the other LSP's based on a total cost from the first node to each of the corresponding third nodes.

7. A method as recited in claim 5, wherein when there are a plurality of particular paths from the first node to a particular one of the third nodes, the total cost from the first node to third node is based on a selected particular path having a minimum cost.

8. A computer system operable to flood link state packets or packet data units (LSP's) from a first node to a second node, the computer system comprising:
one or more processors;
one or more memory, wherein at least one of the processors and memory are adapted for:
sending the first node's own LSP from the first node to the second node; and
after the first node's own LSP has been sent to the second node, sending a plurality of other LSP's from the first node to the second node, wherein the first node's own LSP is sent first and then the other LSP's are sent by the first node to the second node in an order that corresponds to an ascending order of the relative costs associated with a plurality of paths from the first node to each of these other LSP sending nodes.

9. A computer system as recited in claim 8, wherein the at least one of the processors and memory are further adapted for continuously determining the relative costs of the other LSP's and storing such relative costs in an ascending order of relative costs as each LSP is received into the first node, wherein the order in which the first node sends the other LSP's corresponds to the stored ascending order of the relative costs of such other LSP's.

10. A computer system as recited in claim 9, wherein the at least one of the processors and memory are further adapted for continuously determining the relative costs each time a new LSP is received at the first node.

11. A computer system as recited in claim 8, wherein each of the other LSP's includes connectivity information for one or more fourth nodes connected to the corresponding third node and one or more cost values from such corresponding third node to each of the one or more fourth nodes, and wherein determination of the relative costs is based on a plurality of cost values received within the other LSP's previously sent from the plurality of third nodes to the first node.

12. A computer system as recited in claim 11, wherein the cost values of each of the other LSP's each indicate a cost of a path from the corresponding one of the third nodes and a one of its neighbors.

13. A computer system as recited in claim 12, wherein the relative costs indicate a priority list of the other LSP's based on a total cost from the first node to each of the corresponding third nodes.

14. A computer system as recited in claim 12, wherein when there are a plurality of particular paths from the first node to a particular one of the third nodes, the total cost from the first node to third node is based on a selected particular path having a minimum cost.

15. A computer program product for flooding link state packets or packet data units (LSP's) from a first node to a second node, the computer program product comprising:
at least one computer non-transitory storage readable medium;
computer program instructions stored within the at least one computer readable product configured for: sending the first node's own LSP from the first node to the second node; and after the first node's own LSP has been sent to the second node, sending a plurality of other LSP's from the first node to the second node, wherein the first node's own LSP is sent first and then the other LSP's are sent by the first node to the second node in an order that corresponds to an ascending order of the relative costs associated with a plurality of paths from the first node to each of these other LSP sending nodes.

16. A computer program product as recited in claim 15, wherein the computer program instructions stored within the at least one computer non-transitory storage readable product are further configured for continuously determining the relative costs of the other LSP's and storing such relative costs in an ascending order of relative costs as each LSP is received into the first node, wherein the order in which the first node sends the other LSP's corresponds to the stored ascending order of the relative costs of such other LSP's.

17. A computer program product as recited in claim 15, wherein the computer program instructions stored within the at least one computer non-transitory storage readable product are further configured for continuously determining the relative costs each time a new LSP is received at the first node.

18. A computer program product as recited in claim 17, wherein each of the other LSP's includes connectivity information for one or more fourth nodes connected to the corresponding third node and one or more cost values from such corresponding third node to each of the one or more fourth nodes, and wherein determination of the relative costs is based on a plurality of cost values received within the other LSP's previously sent from the plurality of third nodes to the first node.

19. A computer program product as recited in claim 18, wherein the cost values of each of the other LSP's each indicate a cost of a path from the corresponding one of the third nodes and a one of its neighbors.

20. A computer program product as recited in claim 19, wherein the relative costs indicate a priority list of the other LSP's based on a total cost from the first node to each of the corresponding third nodes.

21. A computer program product as recited in claim 19, wherein when there are a plurality of particular paths from the first node to a particular one of the third nodes, the total cost from the first node to third node is based on a selected particular path having a minimum cost.

* * * * *